US012717727B2

(12) United States Patent
Ahn et al.

(10) Patent No.: US 12,717,727 B2
(45) Date of Patent: Aug. 25, 2026

(54) CLUSTER SYSTEM FOR SHARING DATA USING POOLED MEMORY AND OPERATING METHOD THEREOF

(71) Applicant: SK hynix Inc., Gyeonggi-do (KR)

(72) Inventors: Hyun Woong Ahn, Gyeonggi-do (KR); Jae Yung Jun, Gyeonggi-do (KR); Dong Uk Moon, Gyeonggi-do (KR); Kwang Sik Shin, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 18/945,531

(22) Filed: Nov. 13, 2024

(65) Prior Publication Data

US 2025/0390439 A1 Dec. 25, 2025

(30) Foreign Application Priority Data

Jun. 20, 2024 (KR) ........................ 10-2024-0079979

(51) Int. Cl.
*G06F 12/1072* (2016.01)

(52) U.S. Cl.
CPC .... *G06F 12/1072* (2013.01); *G06F 2212/656* (2013.01)

(58) Field of Classification Search
CPC ........................ G06F 12/1072; G06F 2212/656
See application file for complete search history.

(56) References Cited

U.S. PATENT DOCUMENTS 9,235,529 B2 1/2016 Koka et al.
2022/0206954 A1* 6/2022 Andrejczuk ........ G06F 13/4221
2024/0311316 A1* 9/2024 Lombard ............ G06F 12/1072
2025/0068569 A1* 2/2025 Chen ................... G06F 12/0882
2025/0335226 A1* 10/2025 Hodigere ............ G06F 9/45558

FOREIGN PATENT DOCUMENTS

KR 10-0354274 B1 12/2002

* cited by examiner

*Primary Examiner* — Prasith Thammavong
(74) *Attorney, Agent, or Firm* — IP&T GROUP LLP

(57) ABSTRACT

A cluster system may include a plurality of nodes each including a main memory, and a memory node including a pooled memory which is accessible by the plurality of nodes. The memory node may store, in the pooled memory, a pooled memory page table which indicates address translation information between a virtual address and a physical address of the pooled memory. The plurality of nodes may obtain a physical address of shared data stored in the pooled memory, from the pooled memory page table, and may access the shared data corresponding to the obtained physical address.

18 Claims, 9 Drawing Sheets

CLUSTER SYSTEM FOR SHARING DATA USING POOLED MEMORY AND OPERATING METHOD THEREOF

CROSS-REFERENCE TO RELATED APPLICATION

The present application claims priority under 35 U.S.C. § 119 (a) to Korean Patent Application No. 10-2024-0079979 filed on Jun. 20, 2024, which is incorporated herein by reference in its entirety.

BACKGROUND

1. Technical Field

Embodiments of the present disclosure relate to a cluster system which shares data among a plurality of nodes using a pooled memory, and an operating method thereof.

2. Related Art

A cluster system may include a plurality of nodes and a memory node. The plurality of nodes and the memory node may be connected to enable a direct access through a memory instruction of a processor.

In each of the plurality of nodes, a process executed uses a page table which indicates translation information between a virtual address and a physical address, to directly access data stored in the memory node through a memory instruction.

Processes executed in one node can share a page table stored therein, but can't share a page table stored in another node. Therefore, the plurality of nodes should repeatedly store a page table to directly access data stored in the memory node.

SUMMARY

Embodiments of the present disclosure are directed to providing a cluster system which can prevent a page table used for a plurality of nodes to access a memory node from being repeatedly stored, and an operating method thereof.

In addition, embodiments of the present disclosure are directed to providing a cluster system in which a plurality of nodes can share data more quickly and simply, and an operating method thereof.

In an embodiment, a cluster system may include a plurality of nodes each including a main memory; and a memory node including a pooled memory which is accessible by the plurality of nodes. The memory node may store, in the pooled memory, a pooled memory page table which indicates address translation information between a virtual address and a physical address of the pooled memory. The plurality of nodes may obtain a physical address of shared data stored in the pooled memory, from the pooled memory page table, and may access the shared data corresponding to the obtained physical address.

In another embodiment, a method for operating a cluster system may include storing, in a memory node including a pooled memory accessible by a plurality of nodes each including a main memory, a pooled memory page table which indicates address translation information between a virtual address and a physical address of the pooled memory; storing, by a first node among the plurality of nodes, shared data in the pooled memory; obtaining, by a second node among the plurality of nodes, a physical address corresponding to the shared data from the pooled memory page table; and accessing, by the second node, the shared data corresponding to the obtained physical address.

According to the embodiments of the present disclosure, it is possible to prevent a page table used for a plurality of nodes to access a memory node from being repeatedly stored, and the plurality of nodes may share data more quickly and simply.

DETAILED DESCRIPTION

Figure 1:
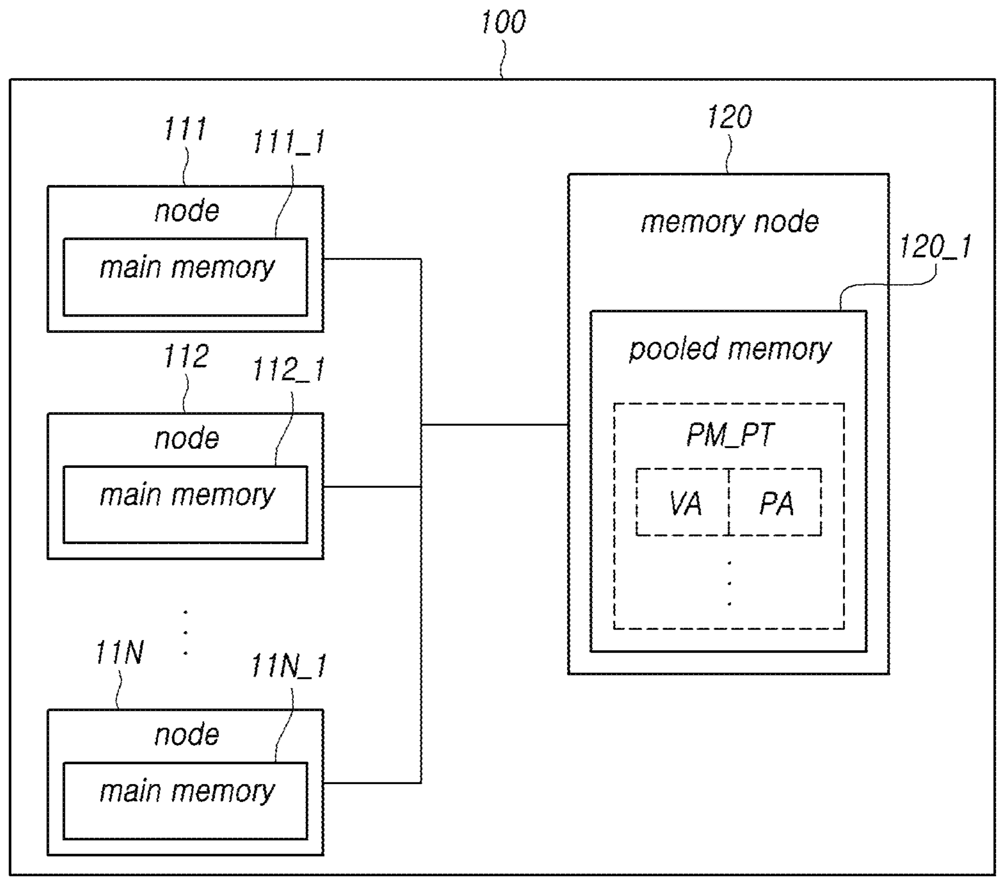
FIG. 1 is a schematic configuration diagram of a cluster system according to the embodiments of the present disclosure.

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily limited to the same embodiment(s). The term "embodiments" when used herein does not necessarily refer to all embodiments.

Various embodiments of the present disclosure are described below in more detail with reference to the accompanying drawings. However, the embodiments of the present disclosure may be embodied in different forms and variations and should not be construed as being limited to the embodiments set forth herein. Rather, the described embodiments are provided so that this disclosure will be thorough and complete, and will fully convey the scope of the present disclosure to those skilled in the art to which this disclosure pertains. Throughout this disclosure, like reference numerals refer to like parts throughout the various figures and embodiments of the present disclosure.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented at least partially in software, the controllers, processors, devices, modules, units, multiplexers, logic, interfaces, decoders, drivers, generators and other signal generating and signal processing features may include, for example, a memory or other storage device for storing code or instructions to be executed, for example, by a computer, processor, microprocessor, controller, or other signal processing device.

FIG. 1 is a schematic configuration diagram of a cluster system 100 according to the embodiments of the present disclosure.

Referring to FIG. 1, the cluster system 100 may include a plurality of nodes 111, 112, . . . , 11N and a memory node 120.

The plurality of nodes 111, 112, . . . , 11N may include main memories 111_1, 112_1, . . . , 11N_1, respectively. The main memories 111_1, 112_1, . . . , 11N_1 may store data.

Each of the plurality of nodes 111, 112, . . . , 11N may be implemented as various types of devices.

Each of the plurality of nodes 111, 112, . . . , 11N may be a computer, an ultra mobile PC (UMPC), a workstation, a personal digital assistant (PDA), a tablet, a mobile phone, a smartphone, an e-book, a portable multimedia player (PMP), a portable game player, a navigation device, a black box, a digital camera, a digital multimedia broadcasting (DMB) player, a smart television, a digital audio recorder, a digital audio player, a digital picture recorder, a digital picture player, a digital video recorder, a digital video player, a storage configuring a data center, one of various electronic devices configuring a home network, one of various electronic devices configuring a computer network, one of various electronic devices configuring a telematics network, a radio frequency identification (RFID) device, a mobility device (e.g., a vehicle, a robot or a drone) capable of traveling under human control or autonomous driving, or the like. Alternatively, each of the plurality of nodes 111, 112, . . . , 11N may be a virtual reality (VR) device which provides a 2D or 3D virtual reality image or an augmented reality (AR) device which provides an augmented reality image. In addition, each of the plurality of nodes 111, 112, . . . , 11N may be any one of various computing devices.

For example, the plurality of nodes 111, 112, . . . , 11N may drive at least one operating system (OS). The operating system may manage and control the overall functions and operations of the plurality of nodes 111, 112, . . . , 11N. The operating system may be classified into a general operating system and a mobile operating system depending on the mobility of the plurality of nodes 111, 112, . . . , 11N.

Each of the plurality of nodes 111, 112, . . . , 11N may execute at least one process. The process executed by each node may be loaded into a main memory included in the node, and may execute a predefined operation.

Each of the main memories 111_1, 112_1, . . . , 11N_1 may also be implemented as various types of memories.

Each of the main memories 111_1, 112_1, . . . , 11N_1 may store a program code, a command or data required to execute a process.

Each of the main memories 111_1, 112_1, . . . , 11N_1 may include, for example, as a volatile memory, at least one of static random access memory (SRAM), dynamic RAM (DRAM) and synchronous DRAM (SDRAM).

The memory node 120 may include a pooled memory 120_1 which may be accessed by the plurality of nodes 111, 112, . . . , 11N.

The memory node 120 may store a pooled memory page table PM_PT in the pooled memory 120_1.

The pooled memory page table PM_PT indicates address translation information between a virtual address VA and a physical address PA of the pooled memory 120_1. A virtual address VA and a physical address PA may be mapped on a page basis.

Similarly to the plurality of nodes 111, 112, . . . , 11N, the memory node 120 may also be implemented as various types of devices. Similarly to the main memories 111_1, 112_1, . . . , 11N_1, the pooled memory 120_1 may also be implemented as various types of memories.

In the embodiments of the present disclosure, the plurality of nodes 111, 112, . . . , 11N and the memory node 120 may communicate with each other through a communication interface (e.g., Compute express Link (CXL)).

To this end, the plurality of nodes 111, 112, . . . , 11N and the memory node 120 may be connected to a network. For example, the network may be configured with a bus which provides communication channels between the plurality of nodes 111, 112, . . . , 11N and the memory node 120.

In the above, the basic structures of the plurality of nodes 111, 112, . . . , 11N and the memory node 120 included in the cluster system 100 have been described.

In the embodiments of the present disclosure, each of the plurality of nodes 111, 112, . . . , 11N may obtain the physical address of shared data stored in the pooled memory 120_1 of the memory node 120, through the pooled memory page table PM_PT, and may access the shared data through the obtained physical address.

Below, operations in which the plurality of nodes 111, 112, . . . , 11N access shared data stored in the pooled memory 120_1 of the memory node 120 will be described through FIGS. 2 and 3.

Figure 2:
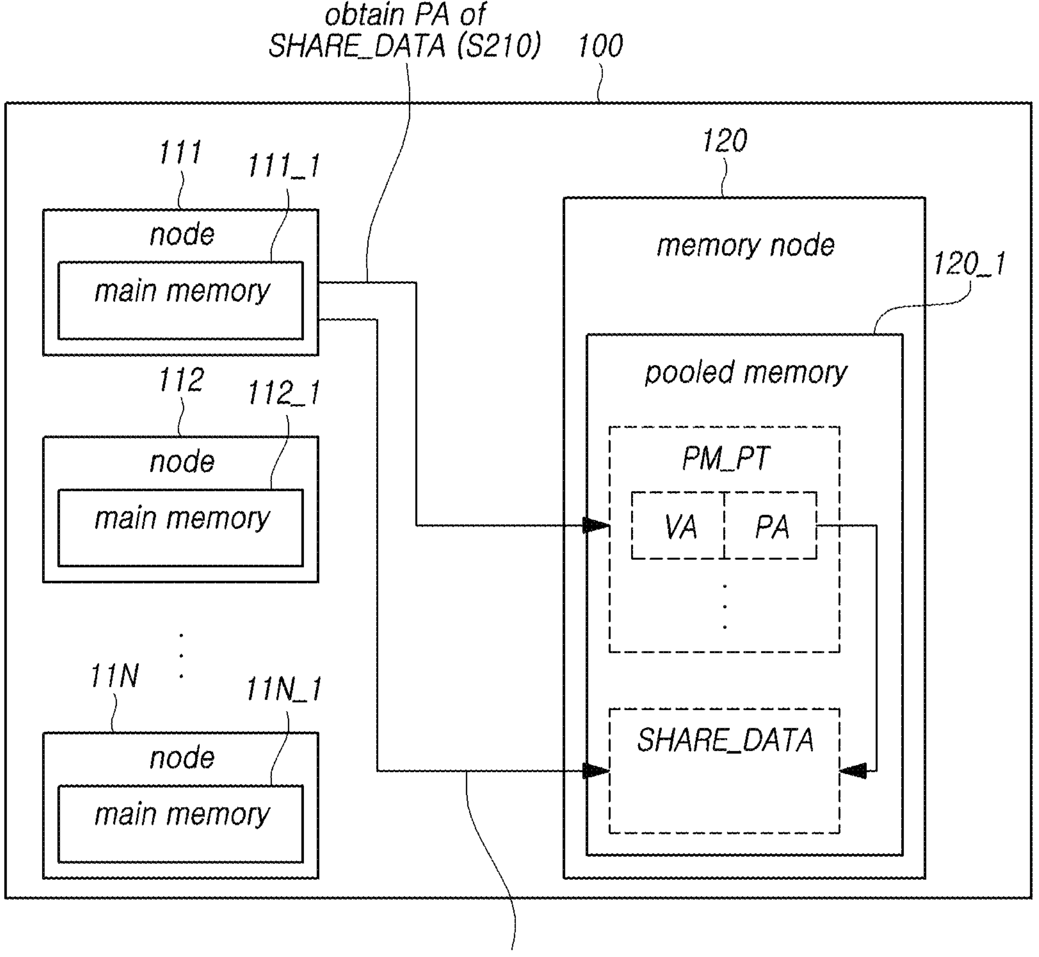
FIG. 2 is a diagram illustrating an operation in which a first node among a plurality of nodes accesses shared data according to the embodiments of the present disclosure.

FIG. 2 is a diagram illustrating an operation in which a first node 111 among the plurality of nodes 111, 112, . . . , 11N accesses shared data SHARE_DATA according to the embodiments of the present disclosure.

Referring to FIG. 2, the first node 111 may access the pooled memory page table PM_PT stored in the pooled memory 120_1 of the memory node 120, and thereby, may obtain a physical address PA of shared data SHARE_DATA (S210). The pooled memory page table PM_PT stores address translation information between a virtual address VA and the physical address PA for the shared data SHARE_DATA stored in the pooled memory 120_1.

The first node 111 may access the shared data SHARE_DATA through the physical address PA obtained in the operation S210 (S220).

In order to access the shared data SHARE_DATA, the first node 111 does not separately store, in the main memory 111_1 thereof, a page table which stores the physical address PA of the shared data SHARE_DATA. Instead, the first node 111 accesses the pooled memory page table PM_PT stored in the pooled memory 120_1.

Figure 3:
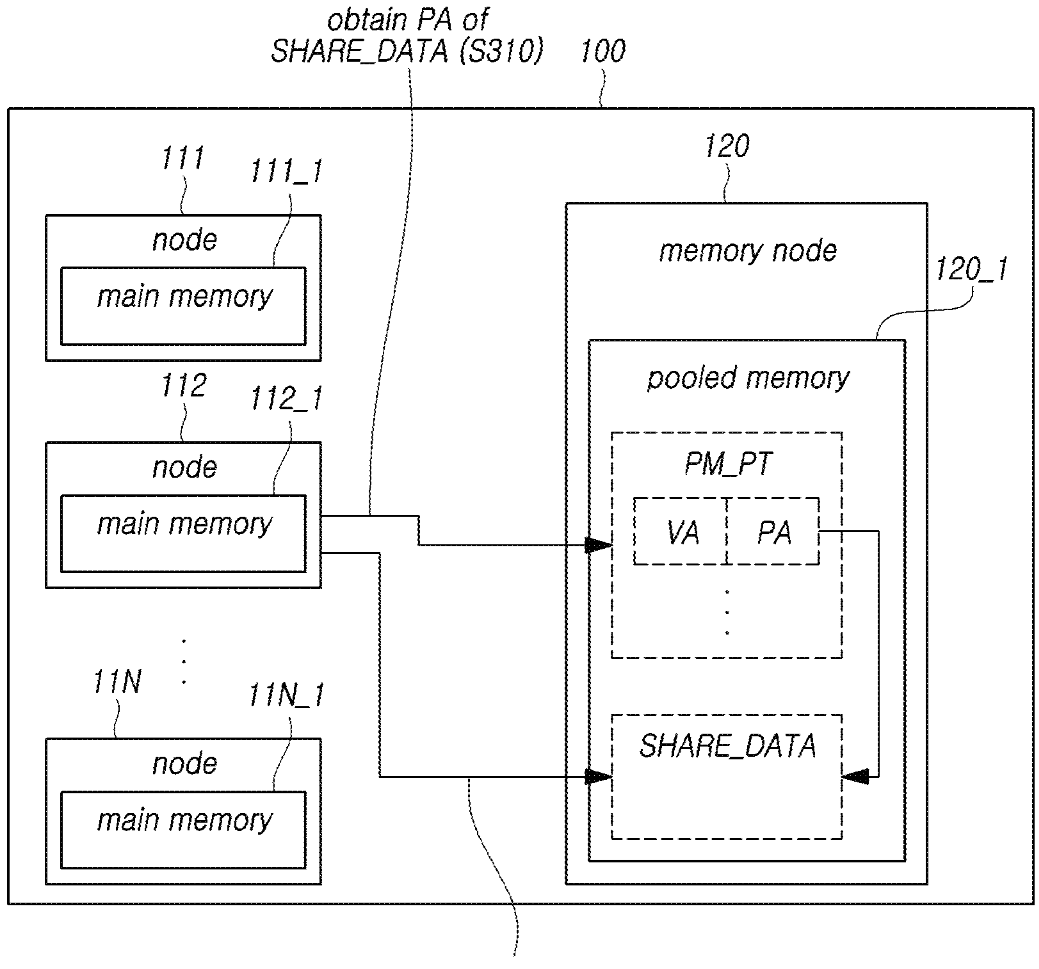
FIG. 3 is a diagram illustrating an operation in which a second node among the plurality of nodes accesses shared data according to the embodiments of the present disclosure.

FIG. 3 is a diagram illustrating an operation in which a second node 112 among the plurality of nodes 111, 112, . . . , 11N accesses shared data SHARE_DATA according to the embodiments of the present disclosure.

Referring to FIG. 3, similar to the first node 111, the second node 112 may access the pooled memory page table PM_PT stored in the pooled memory 120_1 of the memory node 120, and thereby, may obtain a physical address PA of shared data SHARE_DATA (S310).

The second node 112 may access the shared data SHARE_ DATA through the physical address PA obtained in the operation S310 (S320).

Similar to the first node 111, the second node 112 also does not store, in the main memory 112_1 thereof, a page table which stores the physical address PA of the shared data SHARE_DATA. Instead, the second node 112 accesses the pooled memory page table PM_PT stored in the pooled memory 120_1.

In this way, to obtain the value of the physical address PA of the shared data SHARE_DATA stored in the pooled memory 120_1, the plurality of nodes 111, 112, . . . , 11N use the common pooled memory page table PM_PT instead of using separate page tables.

Through this, it is possible to prevent the plurality of nodes 111, 112, . . . , 11N from repeatedly storing page tables to access the shared data SHARE_DATA stored in the pooled memory 120_1.

As described above, each of the plurality of nodes 111, 112, . . . , 11N may access the shared data SHARE_DATA stored in the pooled memory 120_1 using the common pooled memory page table PM_PT.

Each of the plurality of nodes 111, 112, . . . , 11N may use a separate page table to access data stored in a main memory thereof.

Therefore, each of the plurality of nodes 111, 112, . . . , 11N should determine whether to search for address translation information for a virtual address in a page table stored therein or in the pooled memory page table PM_PT.

To this end, in the embodiments of the present disclosure, each of the plurality of nodes 111, 112, . . . , 11N stores a first level page table in the main memory thereof.

The first level page table may indicate, for a specific target virtual address, a second level page table or the above-described pooled memory page table PM_PT as a page table which includes address translation information on the target virtual address.

The second level page table is stored in the main memory of each node. The second level page table may indicate address translation information between a virtual address and a physical address of the main memory of each node.

Figure 4:
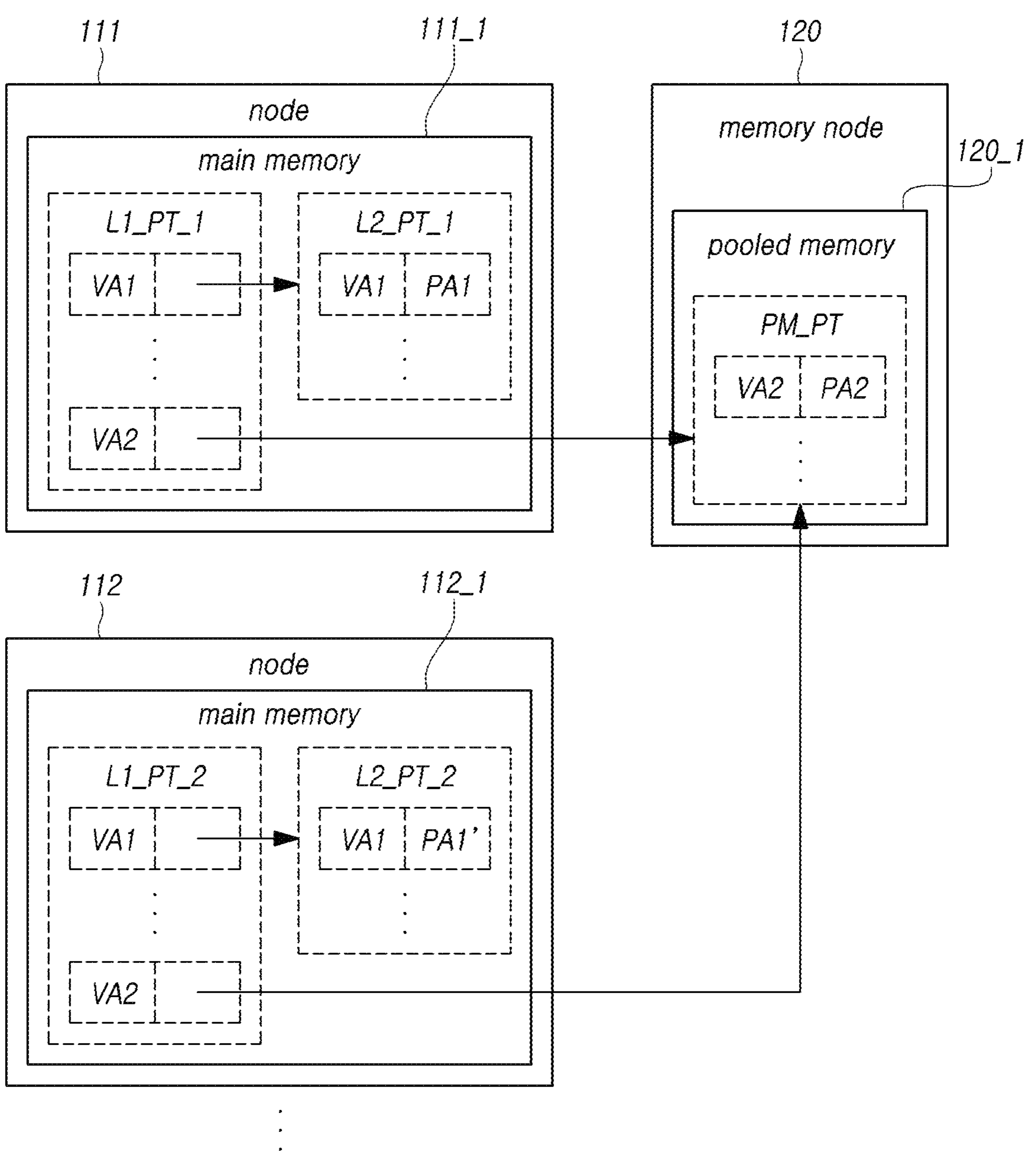
FIG. 4 is a diagram illustrating the structure of a page table of each of the plurality of nodes according to the embodiments of the present disclosure.

FIG. 4 is a diagram illustrating the structure of a page table of each of the plurality of nodes 111, 112, . . . , 11N according to the embodiments of the present disclosure.

Referring to FIG. 4, the first node 111 may store a first level page table L1_PT_1 in the main memory 111_1.

The first level page table L1_PT_1 may indicate, for a target virtual address, a second level page table L2_PT_1 stored in the main memory 111_1 of the first node 111 or the pooled memory page table PM_PT as a page table which includes address translation information on the target virtual address.

In FIG. 4, the first level page table L1_PT_1 indicates the second level page table L2_PT_1 as a page table which indicates address translation information on a virtual address VA1. Further, the first level page table L1_PT_1 indicates the pooled memory page table PM_PT as a page table which indicates address translation information on a virtual address VA2.

Therefore, when the target virtual address is the virtual address VA1, the first level page table L1_PT_1 indicates the second level page table L2_PT_1 as a page table which indicates address translation information on the target virtual address.

In some embodiments, the first node 111 searches for a physical address PA1 corresponding to the target virtual address in the second level page table L2_PT_1.

When the target virtual address is the virtual address VA2, the first level page table L1_PT_1 indicates the pooled memory page table PM_PT as a page table which indicates address translation information on the target virtual address.

In some embodiments, the first node 111 searches for a physical address PA2 corresponding to the target virtual address in the pooled memory page table PM_PT. That is, the first node 111 does not generate a separate page table for accessing the pooled memory 120_1, but refers to the pooled memory page table PM_PT stored in the pooled memory 120_1.

Similarly, the second node 112 may store a first level page table L1_PT_2 in the main memory 112_1.

The first level page table L1_PT_2 may indicate, for a target virtual address, a second level page table L2_PT_2 stored in the main memory 112_1 of the second node 112, or the pooled memory page table PM_PT as a page table which includes address translation information on the target virtual address.

In FIG. 4, the first level page table L1_PT_2 indicates the second level page table L2_PT_2 as a page table which indicates address translation information on a virtual address VA1. Further, the first level page table L1_PT_2 indicates the pooled memory page table PM_PT as a page table which indicates address translation information on a virtual address VA2.

Therefore, when the target virtual address is the virtual address VA1, the first level page table L1_PT_2 indicates the second level page table L2_PT_2 as a page table which indicates address translation information on the target virtual address.

In some embodiments, the second node 112 searches for a physical address PA1' corresponding to the target virtual address in the second level page table L2_PT_2.

When the target virtual address is the virtual address VA2, the first level page table L1_PT_2 indicates the pooled memory page table PM_PT as a page table which indicates address translation information on the target virtual address.

In some embodiments, the second node 112 searches for a physical address PA2 corresponding to the target virtual address in the pooled memory page table PM_PT.

When a target virtual address is the virtual address VA2, both the first node 111 and the second node 112 refer to the pooled memory page table PM_PT for the same virtual address VA2. Therefore, the first node 111 and the second node 112 may obtain the same physical address for the virtual address VA2, and through this, may access the same data.

In the embodiments of the present disclosure, the plurality of nodes 111, 112, . . . , 11N need to obtain the address information of the pooled memory page table PM_PT in order to access the pooled memory page table PM_PT.

Below, an operation in which the plurality of nodes 111, 112, . . . , 11N obtain the address information of the pooled memory page table PM_PT will be described with reference to FIGS. 5 and 6.

Figure 5:
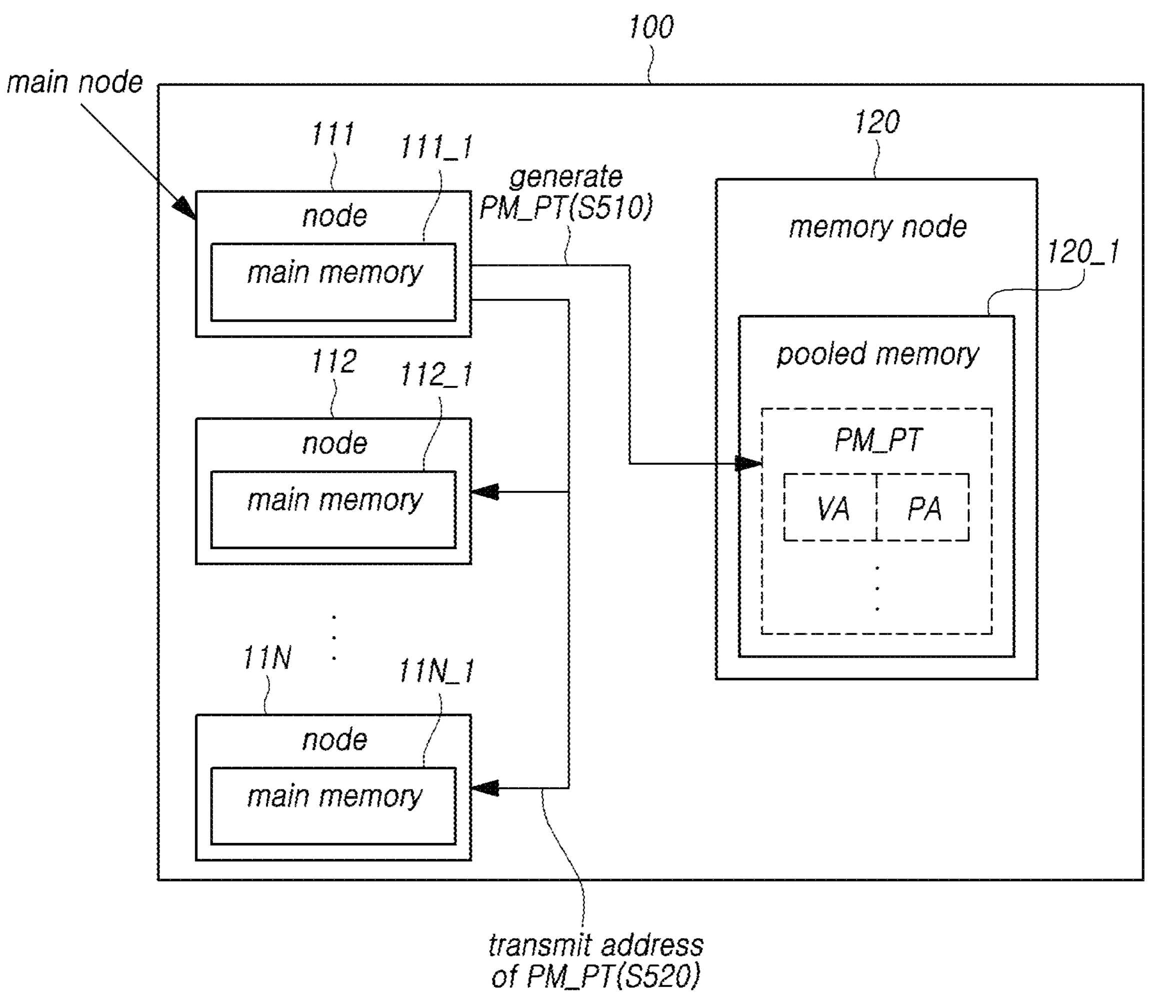
FIG. 5 is a diagram illustrating an operation in which the plurality of nodes obtain address information of a pooled memory page table according to the embodiments of the present disclosure.

FIG. 5 is a diagram illustrating an operation in which the plurality of nodes 111, 112, . . . , 11N obtain the address information of the pooled memory page table PM_PT according to the embodiments of the present disclosure.

In the embodiments of the present disclosure, one of the plurality of nodes 111, 112, . . . , 11N may be a main node which generates the pooled memory page table PM_PT. The main node may also be referred to as a master node.

In FIG. 5, the main node is the first node 111. However, the embodiments of the present disclosure are not limited to the example of FIG. 5, and any node among the plurality of nodes 111, 112, . . . , 11N may become the main node.

In FIG. 5, the first node 111 as the main node may generate the pooled memory page table PM_PT and store the pooled memory page table PM_PT in the pooled memory 120_1 (S510). For example, the first node 111 may generate the pooled memory page table PM_PT when the cluster system 100 is initialized.

The first node 111 may transmit the address information of the pooled memory page table PM_PT to the remaining nodes except the main node among the plurality of nodes 111, 112, . . . , 11N (S520).

Thereafter, the remaining nodes may access the pooled memory page table PM_PT based on the address information of the pooled memory page table PM_PT obtained in the operation S520.

Figure 6:
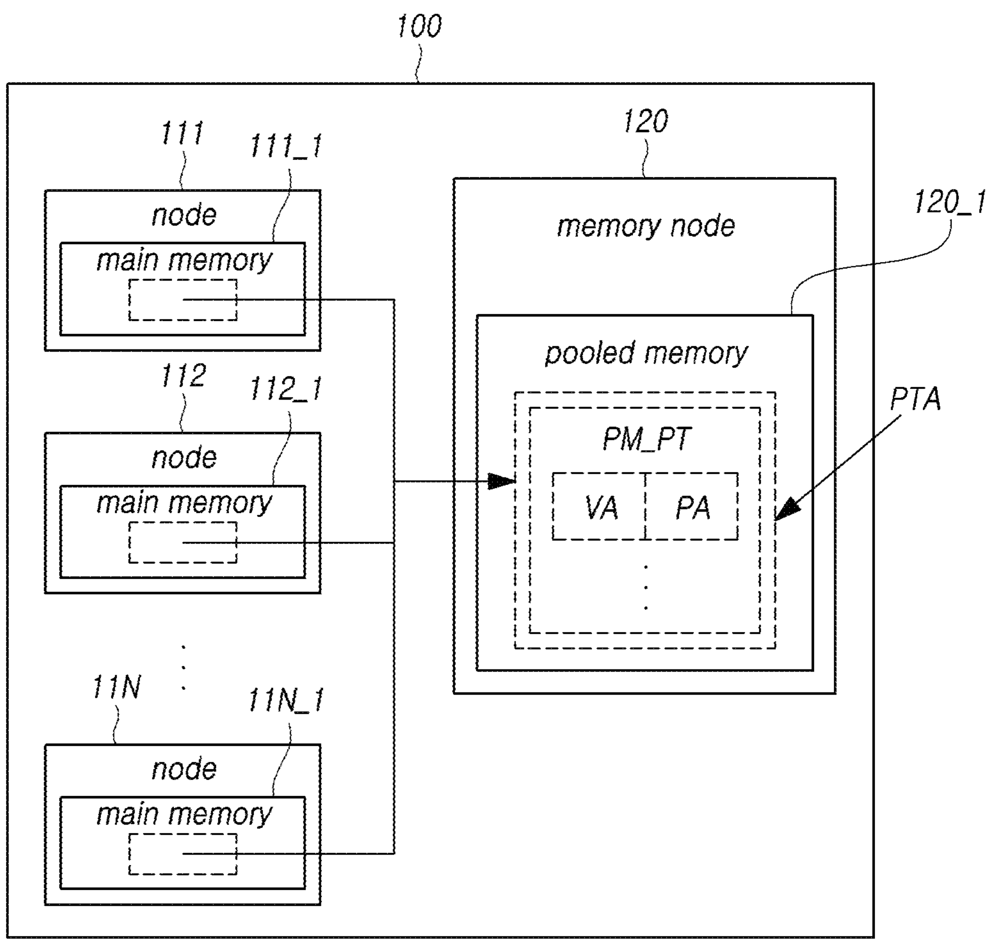
FIG. 6 is a diagram illustrating an operation in which the plurality of nodes obtain address information of a pooled memory page table according to another embodiment of the present disclosure.

FIG. 6 is a diagram illustrating an operation in which the plurality of nodes 111, 112, . . . , 11N obtain the address information of the pooled memory page table PM_PT according to another embodiment of the present disclosure.

Referring to FIG. 6, the memory node 120 may store the pooled memory page table PM_PT in a preset page table area PTA of the pooled memory 120_1.

Each of the plurality of nodes 111, 112, . . . , 11N may store the address information of the page table area PTA, which is shared with all the plurality of nodes 111, 112, . . . , 11N in advance. Each of the plurality of nodes 111, 112, . . . , 11N may access the pooled memory page table PM_PT based on the stored address information.

In FIG. 6, a separate main node for managing the pooled memory page table PM_PT does not exist.

Below, an operation in which the first node 111 and the second node 112 among the plurality of nodes 111, 112, . . . , 11N share data will be described with reference to FIGS. 7 and 8.

Figure 7:
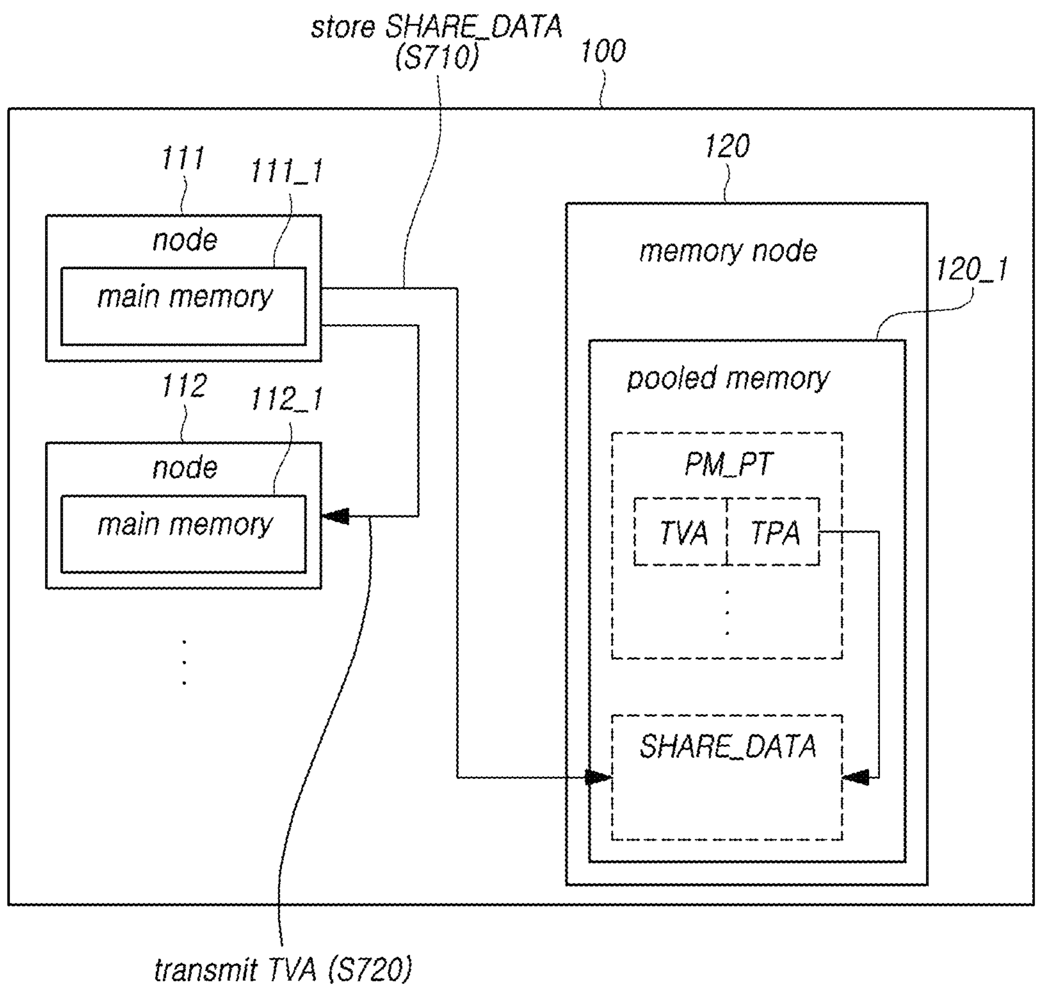
FIG. 7 is a diagram illustrating an operation in which the first node transmits a target virtual address to the second node according to the embodiments of the present disclosure.

FIG. 7 is a diagram illustrating an operation in which the first node 111 transmits a target virtual address TVA to the second node 112 according to the embodiments of the present disclosure.

In FIG. 7, the first node 111 may store shared data SHARE_DATA in the pooled memory 120_1 (S710). Address translation information between a target virtual address TVA and a target physical address TPA corresponding to the shared data SHARE_DATA may be recorded in the pooled memory page table PM_PT.

The first node 111 may transmit the target virtual address TVA corresponding to the shared data SHARE_DATA to the second node 112 (S720). By transmitting the target virtual address TVA to the second node 112 instead of transmitting the entire shared data SHARE_DATA to the second node 112, the first node 111 may more quickly and simply share the shared data SHARE_DATA.

The first node 111 may transmit to the second node 112 the size of the shared data SHARE_DATA together with the target virtual address TVA corresponding to the shared data SHARE_DATA.

Figure 8:
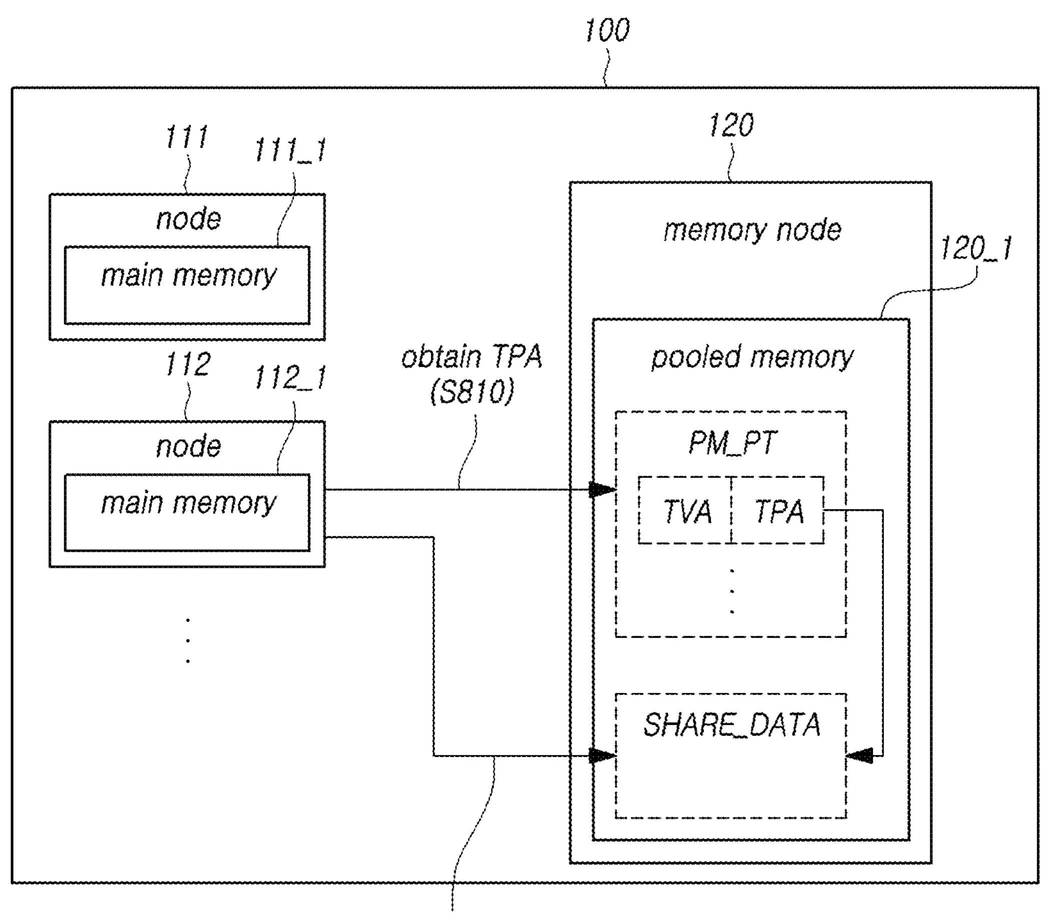
FIG. 8 is a diagram illustrating an operation in which the second node accesses shared data according to the embodiments of the present disclosure.

FIG. 8 is a diagram illustrating an operation in which the second node 112 accesses shared data SHARE_DATA according to the embodiments of the present disclosure.

In FIG. 8, the second node 112 may obtain the target physical address TPA corresponding to the target virtual address TVA through the pooled memory page table PM_PT (S810).

The second node 112 may access the shared data SHARE_ DATA based on the target physical address TPA obtained in the operation S810 (S820).

Figure 9:
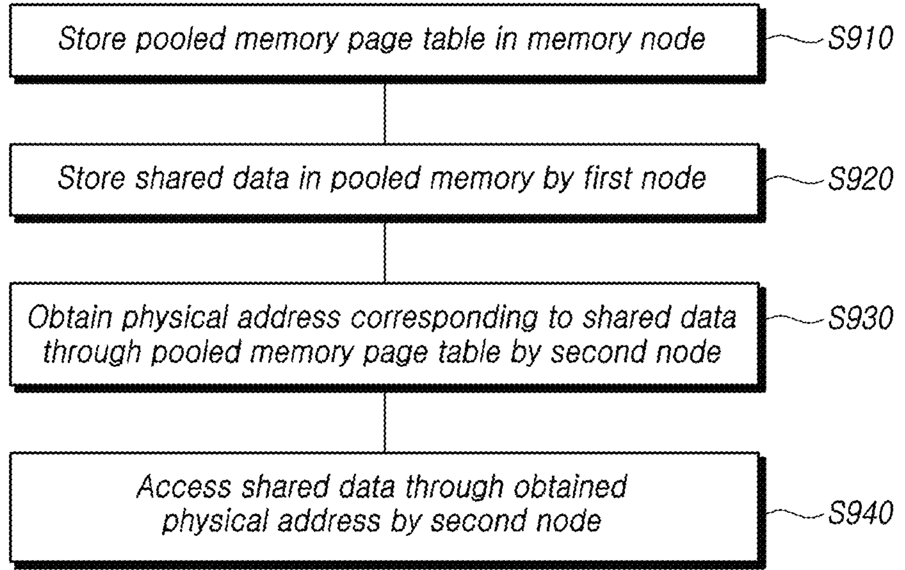
FIG. 9 is a flowchart illustrating a method for operating a cluster system according to the embodiments of the present disclosure.

FIG. 9 is a diagram illustrating a method for operating the cluster system 100 according to the embodiments of the present disclosure.

Referring to FIG. 9, the method for operating the cluster system 100 may include operation S910 of storing, in a memory node 120, a pooled memory page table PM_PT. The memory node 120 may include a pooled memory 120_1 accessible by a plurality of nodes 111, 112, . . . , 11N including main memories 111_1, 112_1, . . . , 11N-1, respectively. The pooled memory page table PM_PT indicates address translation information between a virtual address and a physical address of the pooled memory 120_1.

The plurality of nodes 111, 112, . . . , 11N and the memory node 120 may communicate with each other through a preset interface.

Each of the plurality of nodes 111, 112, . . . , 11N may store a first level page table in the main memory thereof. The first level page table may indicate, for a target virtual address, a second level page table or the pooled memory page table PM_PT as a page table which includes address translation information on the target virtual address. The second level page table may be stored in the main memory of each node, and may indicate address translation information between a virtual address and a physical address of the main memory of each node.

For example, when the first level page table of each node indicates the second level page table as a page table to perform address translation for the target virtual address, each of the plurality of nodes 111, 112, . . . , 11N may search for a physical address corresponding to the target virtual address in the second level page table.

For another example, when the first level page table of each node indicates the pooled memory page table PM_PT as a page table to perform address translation for the target virtual address, each of the plurality of nodes 111, 112, . . . , 11N may search for a physical address corresponding to the target virtual address in the pooled memory page table PM_PT.

For example, the operation S910 may include an operation in which a main node as one of the plurality of nodes 111, 112, . . . , 11N generates the pooled memory page table PM_PT in the pooled memory 120_1, and an operation in which the main node transmits the address information of the pooled memory page table PM_PT to remaining nodes except the main node among the plurality of nodes 111, 112, . . . , 11N.

For another example, in the operation S910, the memory node 120 may store the pooled memory page table PM_PT in a preset page table area PTA of the pooled memory 120_1. In some embodiments, each of the plurality of nodes 111, 112, . . . , 11N may store the address information of the page table area PTA.

The method for operating the cluster system 100 may include operation S920 in which a first node 111 among the plurality of nodes 111, 112, . . . , 11N stores shared data SHARE_DATA in the pooled memory 120_1.

For example, the operation S920 may include an operation in which the first node 111 stores the shared data SHARE_DATA in the pooled memory 120_1, and an operation in which the first node 111 transmits a target virtual address corresponding to the shared data SHARE_DATA to a second node 112 among the plurality of nodes 111, 112, . . . , 11N.

The method for operating the cluster system 100 may include operation S930 in which the second node 112 among the plurality of nodes 111, 112, . . . , 11N obtains a physical address corresponding to the shared data SHARE_DATA through the pooled memory page table PM_PT.

The method for operating the cluster system 100 may include operation S940 in which the second node 112 accesses the shared data SHARE_DATA through the physical address obtained in the operation S930.

Although various embodiments of the present disclosure have been described for illustrative purposes, those skilled in the art will appreciate that various modifications, additions and substitutions are possible, without departing from the scope and spirit of the present disclosure. Therefore, the embodiments disclosed above and in the accompanying drawings should be considered in a descriptive sense only and not for limiting the technological scope. The technological scope of the present disclosure is not limited by the embodiments and the accompanying drawings. The spirit and scope of the present disclosure should be interpreted in connection with the appended claims and encompass all equivalents falling within the scope of the appended claims. Furthermore, the embodiments may be combined to form additional embodiments.

What is claimed is:

1. A cluster system comprising:

a plurality of nodes each node including a main memory; and a memory node including a pooled memory which is accessible by the plurality of nodes, wherein the memory node stores, in the pooled memory, a common pooled memory page table which indicates address translation information between a virtual address and a physical address of the pooled memory, wherein the plurality of nodes obtain a physical address of shared data stored in the pooled memory, from the common pooled memory page table stored in the pooled memory, and access the shared data corresponding to the obtained physical address, wherein:

each of the plurality of nodes stores a first level page table and a second level page table in the main memory, the first level page table indicates, for a target virtual address, the second level page table or the common pooled memory page table as a page table which includes address translation information on the target virtual address, and the second level page table indicates address translation information between a virtual address and a physical address of the main memory.

2. The cluster system according to claim 1, wherein the plurality of nodes communicate with the memory node through a communication interface.

3. The cluster system according to claim 1, wherein, when the first level page table indicates the second level page table as the page table, each node of the plurality of nodes searches for a physical address corresponding to the target virtual address in the second level page table.

4. The cluster system according to claim 1, wherein, when the first level page table indicates the common pooled memory page table as the page table, each node of the plurality of nodes searches for a physical address corresponding to the target virtual address in the common pooled memory page table.

5. The cluster system according to claim 1, wherein:

one node of the plurality of nodes is a main node, and the main node generates the common pooled memory page table, stores the common pooled memory page table in the pooled memory, and transmits address information of the common pooled memory page table to remaining nodes except the main node among the plurality of nodes.

6. The cluster system according to claim 1, wherein:

the memory node stores the common pooled memory page table in a preset page table area of the pooled memory, and each node of the plurality of nodes stores address information of the page table area.

7. The cluster system according to claim 1, wherein a first node among the plurality of nodes stores the shared data in the pooled memory, and transmits a target virtual address corresponding to the shared data to a second node among the plurality of nodes.

8. A method for operating a cluster system, the method comprising:

storing, in a memory node including a pooled memory accessible by a plurality of nodes each including a main memory, a common pooled memory page table which indicates address translation information between a virtual address and a physical address of the pooled memory;

storing, by a first node among the plurality of nodes, shared data in the pooled memory;

obtaining, by a second node among the plurality of nodes, a physical address corresponding to the shared data from the common pooled memory page table stored in the pooled memory;

accessing, by the second node, the shared data corresponding to the obtained physical address; and storing, by each node of the plurality of nodes, in the main memory of each node, a first level page table and a second level page table, wherein the first level page table indicates, for a target virtual address, the second level page table or the common pooled memory page table as a page table which includes address translation information on the target virtual address, and wherein the second level page table indicates address translation information between a virtual address and a physical address of the main memory.

9. The method according to claim 8, further comprising: communicating by the plurality of nodes with the memory node through a communication interface.

10. The method according to claim 8, further comprising:

when the first level page table indicates the second level page table as the page table, searching for, by each node of the plurality of nodes, a physical address corresponding to the target virtual address in the second level page table.

11. The method according to claim 8, further comprising:

when the first level page table indicates the common pooled memory page table as the page table, searching for, by each node of the plurality of nodes, a physical address corresponding to the target virtual address in the common pooled memory page table.

12. The method according to claim 8, wherein storing the common pooled memory page table comprises:

generating, by a main node as one of the plurality of nodes, the common pooled memory page table for storing in the pooled memory; and transmitting address information of the common pooled memory page table to remaining nodes except the main node among the plurality of nodes.

13. The method according to claim 8, wherein storing the common pooled memory page table comprises: storing, by the memory node, the common pooled memory page table in a preset page table area of the pooled memory, and storing, by each node of the plurality of nodes, address information of the page table area.

14. The method according to claim 8, wherein the storing the shared data in the pooled memory comprises:

storing, by the first node, the shared data in the pooled memory; and transmitting a target virtual address corresponding to the shared data to a second node among the plurality of nodes.

15. The cluster system according to claim 2, wherein the communication interface includes a Compute eXpress Link.

16. The cluster system according to claim 7, wherein the first node transmits to the second node information on a size of the shared data.

17. The method according to claim 9, wherein the communication interface includes a Compute eXpress Link.

18. The method according to claim 14, further comprising: transmitting, by the first node, to the second node, information on a size of the shared data.

* * * * *